United States Patent [19]

Krug

[11] 4,399,604
[45] Aug. 23, 1983

[54] DISK MAGAZINE FOR USE AS TOOL HOLDER FOR A UNIVERSAL DRILLING AND MILLING MACHINE

[75] Inventor: Willi Krug, Gudensberg, Fed. Rep. of Germany

[73] Assignee: Maho Werkzeugmaschinenbau Babel & Co., Fed. Rep. of Germany

[21] Appl. No.: 331,674

[22] Filed: Dec. 17, 1981

[30] Foreign Application Priority Data

Dec. 30, 1980 [DE] Fed. Rep. of Germany ....... 3049423

[51] Int. Cl.³ .......................................... B23Q 3/157
[52] U.S. Cl. ...................................... 29/568; 211/1.5
[58] Field of Search ................ 29/568, 26 A; 211/1.5; 82/36 A, 36 R; 74/820; 408/35

[56] References Cited

U.S. PATENT DOCUMENTS

| | | | |
|---|---|---|---|
| 632,906 | 9/1899 | Swasey | 74/820 |
| 3,186,266 | 6/1965 | Coate | 29/568 |
| 3,191,294 | 6/1965 | Daugherty | 29/568 |
| 3,277,568 | 10/1966 | Wetzel | 29/568 |
| 3,277,569 | 10/1966 | Verhoeven | 29/568 |
| 4,053,968 | 10/1977 | Johnson et al. | 211/1.5 |
| 4,356,620 | 11/1982 | Babel et al. | 29/568 |

*Primary Examiner*—William R. Briggs
*Attorney, Agent, or Firm*—Kenway & Jenney

[57] ABSTRACT

A disk magazine for holding a plurality of tool holders at the outer periphery thereof. A Geneva drive is provided to achieve incremental rotation of the magazine.

5 Claims, 3 Drawing Figures

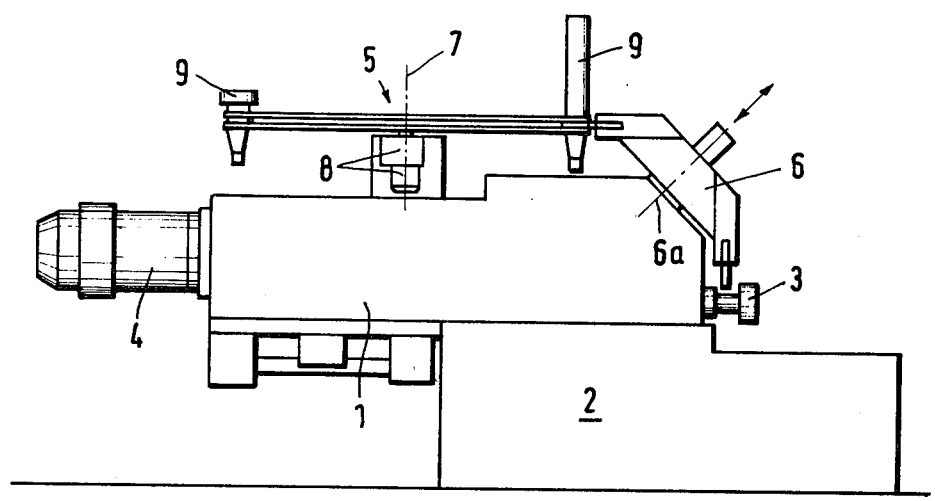
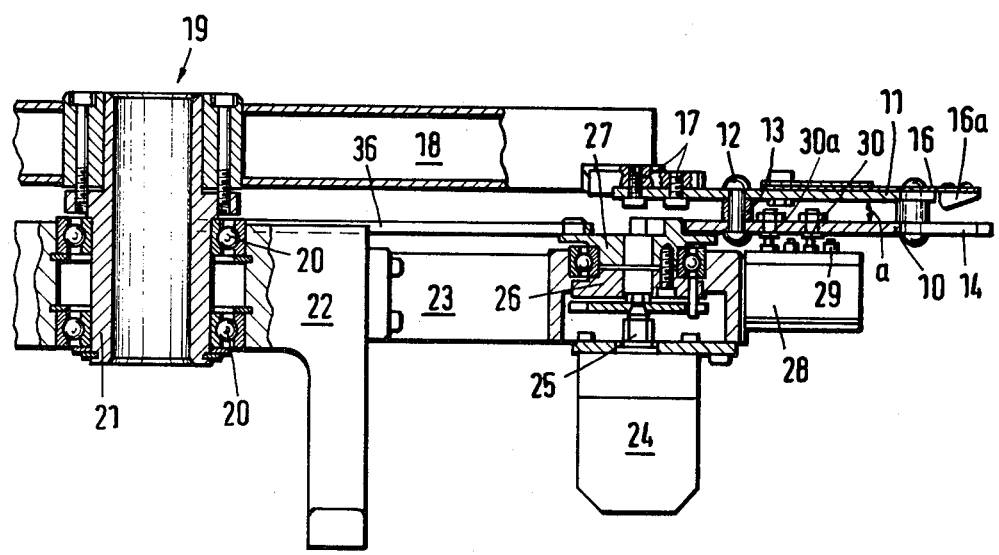

DISK MAGAZINE FOR USE AS TOOL HOLDER FOR A UNIVERSAL DRILLING AND MILLING MACHINE

The present invention relates to a disk magazine in accordance with the preamble of patent claim 1.

It is the object of the disk magazine in accordance with the non-prepublished German Patent Application No. P 29 27 823 to provide a disk magazine for use as tool holder for universal drilling and milling machines, which is of simple construction and therefore easily manufactured, which has a considerably reduced weight as compared to earlier disk magazines and thus requires only small driving forces while the accuracy of positioning is not affected. Basically, the solution of this object resides in the use of two thin annular sheed-metal plates which at their outer circumference have tongs-like recesses serving as tool holders and of which the radial inner edge of the lower annular plate is provided with radical slots and semicircular recesses of a Geneva drive for cooperation with a drive pin and with an annular segment of a drive gear driven by a small electric motor; the annular segment serves as locking and guiding means.

The division of the disk in two separate sheet-steel plates, which may for example be simply punched or nippled from tin plate (sheet-steel) blanks, results in the advantage of a considerable saving of material as compared to conventional magazine disks, which are one-piece cast parts. Since the outer periphery of each sheet-steel plate is provided with a separate tongs-like recess for each tool and both sheet-steel plates are firmly connected together with a fixed spacing therebetween, there results a high rigidity of the disk and a sufficient axial length for securely holding each tool. Because of the considerably reduced weight of the magazine disk the drive unit may be a relatively small electric motor such as an automobile windshield wiper motor; the output shaft of this motor may be directly coupled to the drive gear of the Geneva drive, thus obviating the use of an intermediate reduction. Considerable space can be saved due to the lack of such an intermediate reduction.

In use it has, however, been found that the respective parts of the gear train are subject to early wear. This applies especially to the drive pin and the two flanks of the radical slots formed in the annular disk. Wear of these two parts occurred in particular when the disk magazine was unsymmetrically loaded with tools thus resulting in imbalance conditions subjecting the respective drive members to particularly high loads. For example, undesired imbalance conditions at the disk magazine also occurred when tools having different weight were used.

It is the object of the present invention to reduce the wear of the parts driving the disk magazine.

The above object is solved by the characterizing features of patent claim 1. By the provision of the rocker arm in accordance with the invention, which arm enters into the radial slots, there results large-area contact between the side faces of the rocker arm and the sidewalls of the radial slots. As the rocker arm is mounted on the drive gear through the drive pin, the rotary movement of this drive gear is transmitted to the annular disk solely by the rocker arm. The line contact between the drive pin and the sidewalls of the radial slots, which occurred in the subject matter according to the aforementioned German Patent Application and which was mainly responsible for the relatively early wear of the sidewalls, is prevented by the use of the rocker arm.

In order to ensure ready entry of the outermost radial end of the rocker arm into the respective radial slots the rocker arm is guided at its radially inner portion such that its outermost end will always be positioned immediately before the next following radial slot when the disk ring is in a corresponding engagement position. In accordance with a preferred embodiment of the invention the rocker arm is guided in a guide bracket in the rotational centre of the disk magazine so as to be longitudinally movable.

When the rocker arm is pivotally mounted to a radial lug of the drive gear, the drive unit will require less space and will be of simpler construction than the subject matter according to the aforementioned German Patent Application; in that case the drive gear need only have the diameter of the annular segment, which acts as a locking and guiding means.

An embodiment of the invention will be described in detail with reference to the accompanying drawing, in which:

FIG. 1 is a side elevation of the headstock including the horizontal spindle, the disk magazine and the tool changer;

FIG. 3 is a partially cut-away side view of the disk magazine and the actuating drive.

Figure 2:
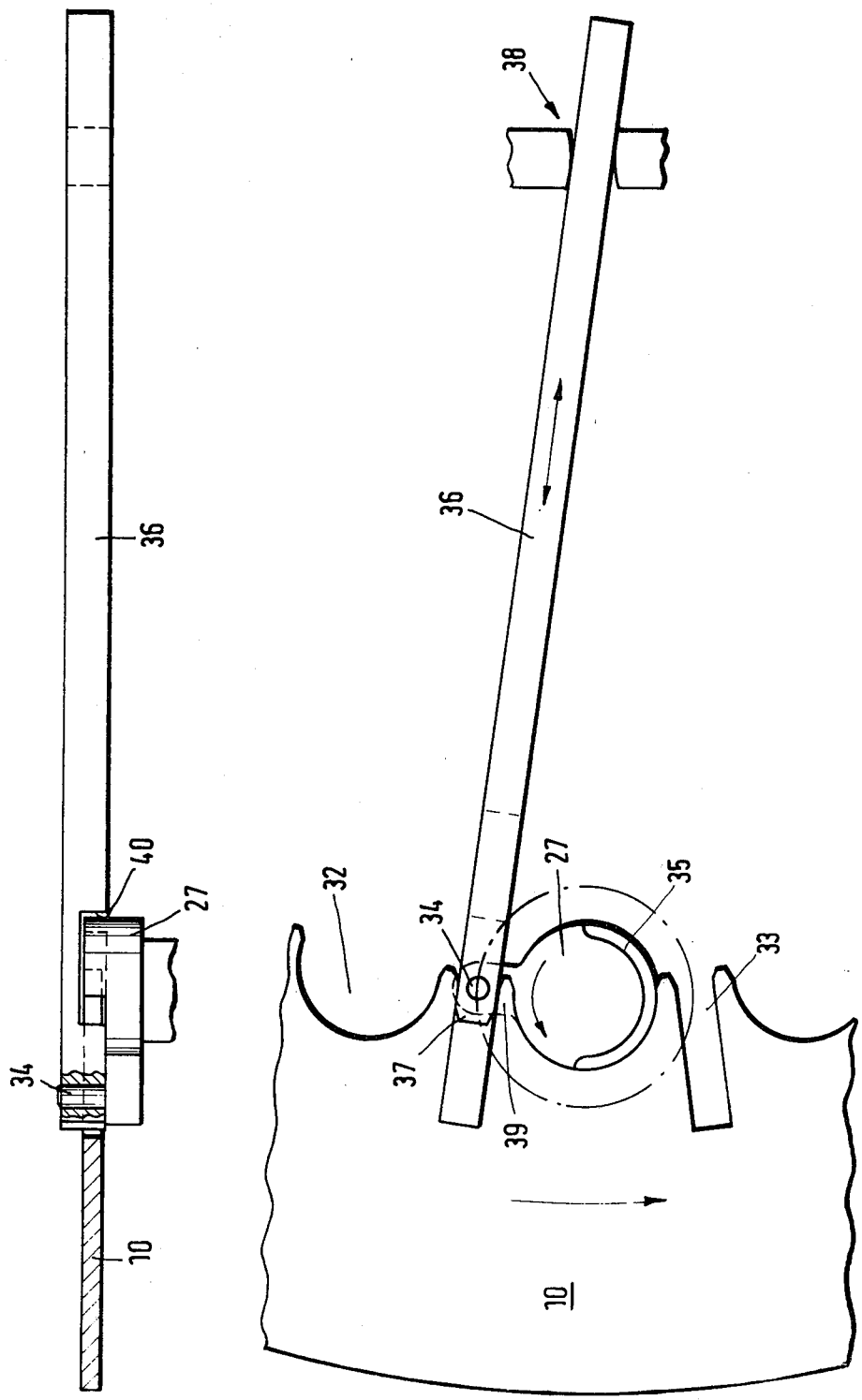
FIG. 2 is a plan view of the lower annular plate including the Geneva drive and the rocking guide means.

FIG. 1 shows a horizontal disk magazine 5 and a tool changer 6 mounted on a horizontal headstock 1 which is horizontally displaceable on a column 2. The tool changer 6 is extensible in the direction of a 45 degree axis 6a and is rotatable through at least 180 degrees about this axis 6a. The disk magazine is rotatable stepwise about a central axis 7 extending perpendicular to the axis of rotation of the spindle 3 by means of an actuating drive 8. At its outer periphery the disk magazine carries a plurality of tools 9.

The disk magazine 5 shown in detail in FIGS. 2 and 3 comprises two separate plates such as sheet-steel rings 10, 11, which are permanently connected together by rivets 12 and spacers 13 with a fixed spacing a therebetween. Both sheet-steel rings 10, 11 have a plurality of semi-circular recesses 14, 15 distributed about their circumference at fixed intervals. Together with spring shackles 16 on the upper sheet-steel ring 11 these recesses 14, 15 form the toll holders. The upwardly pivotable spring shackles 16 likewise have semicircular recesses and are provided with downwardly pointing pawls or claws 16a at both of their radial end areas. The lower surfaces of these pawls or claws 16a are beveled in different directions. These pawls or claws 16a engage the radial notches or grooves in the collar of a tool shaft and thus locate the tools 9 in the magazine disk 5. A radial inner bevel on the pawls 16a pulls the tool shafts into the recesses 14, 15.

The assembly composed of the two sheet-steel rings 10 and 11 is rigidly connected by studs 17 through the inner edge of the upper sheet-steel ring 11 to the ends of arms 18 of a support cross 19. This support cross 19 is rotatably mounted on a bridge 22 which in turn is permanently mounted on the horizontal headstock 2. The support cross mounting is effected by a central bearing composed of ball bearings 20 and a bushing 21. A support arm 23 is bolted laterally to the bridge 22; said support arm 23 supports the actuating drive 8 comprising a commercial truck windshield wiper motor 24 with a vertical output shaft 25, an intermediate gear 26 and a drive gear 27 of an associated Geneva drive non-rotatably connected directly with the intermediate gear 26. Additionally, an indexing device 28 is bolted to said support arm 23. The actuating pins 29 of this indexing device 28 cooperate with nipples projecting from the underside of the lower sheet-steel ring 10. This indexing device has the function of controlling the positioning of the disk magazine, whereby a counting means (not shown) determines the respective position of the disk magazine by simply counting the nipples 30 which are arranged in circles. Additional nipples 30a located on additional circles at larger angular spacings, e.g. 90 degrees, serve to monitor positioning and counting.

As shown in FIG. 2, the inner edge of the lower sheet-steel ring 10 is formed with semicircular recesses 32 in proportion with the spacing of the tool holders 14, and with radial blind slots 33 staggered at fixed angular intervals. A rocker arm 36 is supported through a drive pin 34 on a laterally projecting lug 39 of the drive gear 27 of the Geneva drive. As shown in FIG. 2, the rocker arm 36 upon one complete revolution of the drive gear 27 engages in one of the radial slots 33 and thereby rotates the lower sheet-steel ring 10 of the disk magazine 5 by one step. An annular segment 35 mounted on the surface of the drive gear 27 concentrically to the axis of rotation thereof serves as a locking element to prevent undesirable rotations of the disk magazine. This annular segment 35 remains in a resting or sliding contact with the inner edge of the semicircular recess 32 until rocker arm 36 enters one of the radial blind slots 33 as the drive disk 27 executes a rotary movement, and turns the sheet-steel ring 10, i.e., the disk magazine 5, about the axis of rotation at the central bearing. The arrangement and shape of the annular segment 35 and the rocker arm 36 are matched so that the relative position between the drive gear 27 and the sheet-steel ring 10 is determined by the annular segment 35 in all positions in which the rocker arm 36 engages none of the radial slots 33. Hence, no special locking means such as socket pins or the like is required.

The rocker arm 36 is supported so as to be longitudinally movable in the direction of the double arrow, and its radial inner end is guided within a guide bracket 38 which is disposed in the centre of rotation of the ring gear. The radial outer ends of the rocker arm 36 are cambered in order to facilitate entry of the arm into the respective radial slots 33 of the annular disk 10. Furthermore, the radial outer end 37 of the rocker arm is supported on a radial lug 39 of the drive gear 27. A recess 40 is machined into the lower part of the rocker arm 36 (cf. upper part of FIG. 2) in order to permit an easy passage across the annular segment 35 upon every rotational movement of the drive gear 27.

The invention is not limited to the embodiment shown. In particular, the guide bracket may be replaced by another guide member which ensures that the rocker arm — which may, if desired, be considerably shortened — immediately prior to entering the radial slot is oriented in longitudinal direction of the slot, i.e., approximately radially. Such a guiding or positioning may e.g. also be effected by resilient abutments or the like.

I claim:

1. A disk magazine useful as tool holder for universal drilling and milling machines, comprising a disk horizontally mounted on the machine through the headstock, a plurality of tongs-like tool holders provided at the outer periphery of the disk at a fixed spacing, and an actuating motor which through a Geneva drive rotates the disk magazine about its axis of rotation in steps determined by the spacing of the tool holders, wherein the disk of the disk magazine is composed of two flat plates connected together at a fixed spacing therebetween and having at their circular outer circumference tongs-like recesses serving as common tool holders, said plates being non-rotatably connected to the central bearing, and wherein one of said plates is the annular disk which at its inner edge is formed alternately with radial slots and with semicircular recesses of the Geneva drive, and wherein the drive shaft of the actuating motor is coupled to the drive gear of the Geneva drive, the eccentrically disposed drive pin of said Geneva drive being associated with the radial slots in said annular disk, and the locking and guiding portion of said Geneva drive, which portion is in the form of an annular segment, being associated with the semicircular recesses in the annular disk, characterized in that a rocker arm (36) is pivotally mounted to the drive pin (34), said radial outer end portion (37) of said rocker arm (36) alternately entering the radial slots (33) in the annular disk (10).

2. A disk magazine as claimed in claim 1, characterized in that the rocker arm (36) is movably guided in approximately radial orientation in the rotational centre of the disk magazine (5) within a guide bracket (38).

3. A disk magazine as claimed in claim 2, characterized in that the guide bracket (38) is rotatably supported.

4. A disk magazine as claimed in any one of the claims 1 to 3, characterized in that the rocker arm (36) is pivoted to a radial lug (39) of the gear (27).

5. A disk magazine as claimed in any one of the claims 1 to 4, characterized in that the radial outer end (37) of the rocker arm (36) is rounded off.

* * * * *